(12) United States Patent
Spears et al.

(10) Patent No.: US 9,611,970 B2
(45) Date of Patent: Apr. 4, 2017

(54) PIPE CAP

(71) Applicant: SPEARS MANUFACTURING CO., Sylmar, CA (US)

(72) Inventors: Wayne Spears, Agua Dulce, CA (US); John Bosanek, Camarillo, CA (US)

(73) Assignee: Spears Manufacturing Co., Sylmar, CA (US)

( * ) Notice: Subject to any disclaimer, the term of this patent is extended or adjusted under 35 U.S.C. 154(b) by 0 days.

(21) Appl. No.: 14/932,510

(22) Filed: Nov. 4, 2015

(65) Prior Publication Data
US 2016/0131296 A1 May 12, 2016

Related U.S. Application Data

(60) Provisional application No. 62/076,008, filed on Nov. 6, 2014.

(51) Int. Cl.
F16L 55/10 (2006.01)
F16L 55/115 (2006.01)

(52) U.S. Cl.
CPC ................ F16L 55/1157 (2013.01)

(58) Field of Classification Search
USPC ....... 138/89, 90, 96 R; 285/3, 322, 308, 319
See application file for complete search history.

(56) References Cited

U.S. PATENT DOCUMENTS

| 2,779,610 | A | | 1/1957 | Risley |
| 3,312,483 | A | | 4/1967 | Leadbetter et al. |
| 3,312,484 | A | | 4/1967 | Davenport |
| 3,429,596 | A | | 2/1969 | Marshall |
| 3,591,208 | A | | 7/1971 | Nicolaus |
| 3,814,136 | A | * | 6/1974 | Johnson ............. F02M 37/0017 138/89 |
| 4,062,572 | A | | 12/1977 | Davis |
| 4,072,328 | A | * | 2/1978 | Elliott ................. F16L 19/0218 285/148.28 |
| 4,288,113 | A | * | 9/1981 | Saulnier ................ F16L 37/091 285/238 |
| 4,372,586 | A | | 2/1983 | Rosenberg et al. |

(Continued)

OTHER PUBLICATIONS

Flo Control Quality Products by NDS products Catalog, Sep. 2014, 32 pages.

(Continued)

Primary Examiner — James Hook
(74) Attorney, Agent, or Firm — Jeffrey G. Sheldon; Leech Tishman Fuscaldo & Lampl

(57) ABSTRACT

A pipe cap comprising a body; a close-ended bore defined by the body, being sized and dimensioned to accept and rigidly retain an end of a pipe section; an end connector wherein the bore extends out through the end connector; a gasket well in the internal surface of the bore; a gasket for sealing the body to the end of the pipe section, and preventing fluids from flowing out the end of the pipe section; a gasket retaining ring within the gasket well, comprising a shoulder and retaining the gasket within the gasket well; and a gripper washer disposed in the internal surface of the bore, the gripper washer retained between the end connector and the gasket retaining ring, the outer periphery of the gripper washer is in contact with, or in close proximity to, the shoulder of the gasket retaining ring.

14 Claims, 1 Drawing Sheet

(56) References Cited

U.S. PATENT DOCUMENTS

Figure 1:
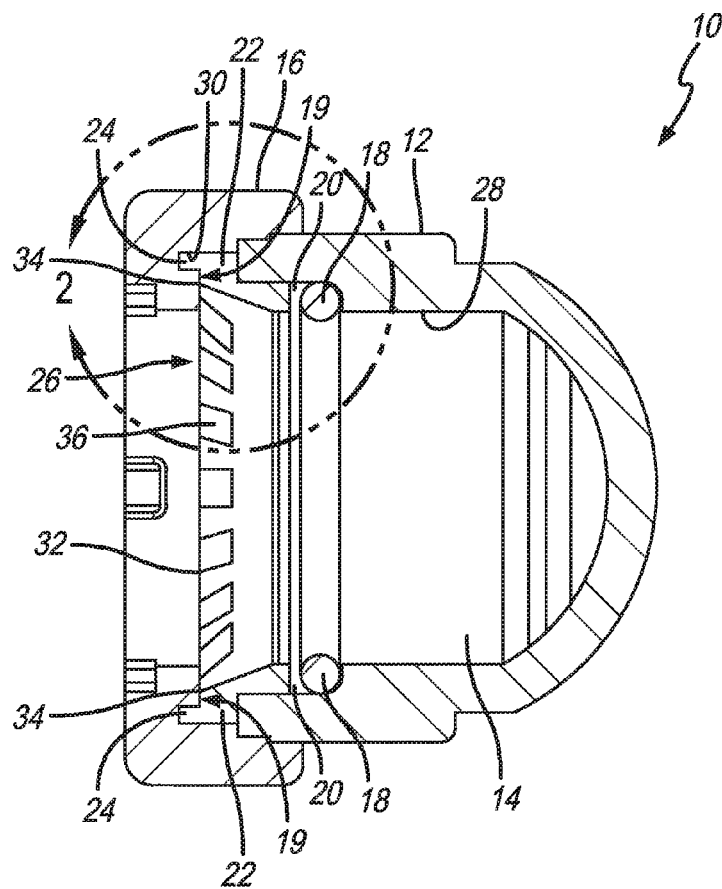

| | | | |
|---|---|---|---|
| 4,445,714 A | 5/1984 | Kisiel, II | |
| 4,919,457 A * | 4/1990 | Moretti | F16L 37/091 285/308 |
| 4,932,686 A | 6/1990 | Anderson, Jr. | |
| 5,024,469 A | 6/1991 | Aitken et al. | |
| 5,487,572 A * | 1/1996 | Combot-Courrau | F16L 37/091 285/308 |
| 5,553,901 A * | 9/1996 | Serot | F16L 37/091 285/322 |
| 5,911,443 A * | 6/1999 | Le Quere | F16L 37/0915 285/23 |
| 6,056,326 A * | 5/2000 | Guest | F16L 21/04 285/314 |
| 6,450,550 B1 * | 9/2002 | Cornwell | F16L 19/0283 285/340 |
| 6,464,266 B1 | 10/2002 | O'Neill et al. | |
| 7,063,359 B2 * | 6/2006 | Vallee | F16L 37/0915 285/3 |
| 7,121,593 B2 * | 10/2006 | Snyder, Sr. | F16L 37/091 285/179 |
| 7,530,606 B1 * | 5/2009 | Yang | F16L 37/091 285/308 |
| 7,841,630 B1 | 11/2010 | Auray et al. | |
| 8,313,607 B2 | 11/2012 | Quinn | |
| 8,480,134 B2 * | 7/2013 | Crompton | F16L 37/091 285/315 |
| 8,491,012 B2 | 7/2013 | Lequere | |
| 8,764,066 B1 | 7/2014 | Rice et al. | |
| 8,844,981 B1 * | 9/2014 | Crompton | F16L 37/091 285/315 |
| 2007/0075542 A1 * | 4/2007 | Glaze | F16L 37/091 285/322 |
| 2011/0101685 A1 * | 5/2011 | Lai | B25B 27/10 285/345 |
| 2012/0326439 A1 * | 12/2012 | Bogert | F16L 19/12 285/354 |
| 2014/0062078 A1 | 3/2014 | Weissmann | |
| 2015/0345683 A1 | 12/2015 | Crompton et al. | |
| 2016/0097477 A1 | 4/2016 | Spears et al. | |
| 2016/0131289 A1 | 5/2016 | Spears et al. | |

OTHER PUBLICATIONS

USPTO, Non-Final Office Action on the Merits issued in related Spears et al. U.S. Appl. No. 14/876,791 on Apr. 18, 2016, 20 pages.

USPTO, Final Office Action on the Merits issued in related Spears et al. U.S. Appl. No. 14/876,791 on Sep. 1, 2016, 12 pages.

USPTO, Non-Final Office Action on the Merits issued in related Spears et al. U.S. Appl. No. 14/932,452 on Apr. 1, 2016, 17 pages.

USPTO, Final Office Action on the Merits issued in related Spears et al. U.S. Appl. No. 14/932,452 on May 9, 2016, 11 pages.

USPTO, Non-Final Office Action on the Merits issued in related Spears et al. U.S. Appl. No. 14/876,791 on Jan. 12, 2017 (24 pages).

USPTO, Non-Final Office Action on the Merits issued in related Spears et al. U.S. Appl. No. 14/932,452 on Nov. 4, 2016 (21 pages).

* cited by examiner

PIPE CAP

CROSS-REFERENCE TO RELATED APPLICATIONS

This application claims the benefit of U.S. Provisional Patent Application No. 62/076,008 titled "Pipe Cap," filed Nov. 6, 2014, the contents of which are incorporated herein by reference in their entirety.

BACKGROUND OF THE INVENTION

Pipe caps for capping open ends of pipe sections are well known. Pipe caps are solid structures having a close-ended bore which is sized and dimensioned to accept and rigidly retain the end of the pipe section for which the end cap is to be used.

For end caps used with plastic pipes, the end caps are secured and sealed to an end of a pipe section by threads, adhesives or by a welding procedure, such as solvent cement or butt fusion.

A problem arises in such prior art pipe cap designs in that the pipe must be threaded which is not feasible for thin wall pipes. Alternately, the use of adhesives, welding procedures, and threading procedures are labor intensive and time-consuming. This is especially a problem where the pipe cap is to be used in an emergency repair situation.

Accordingly, there is a need for an improved pipe cap which avoids this problem in the prior art. The present invention satisfies this need.

SUMMARY OF THE INVENTION

According to one embodiment of the present invention, there is provided a pipe cap comprising a) a body; b) a close-ended bore defined by the body, the close-ended bore comprising an internal surface and being sized and dimensioned to accept and rigidly retain an end of a pipe section for which the end cap is to be used; c) an end connector comprising an internal surface, wherein the bore extends out through the end connector; d) a gasket well defined in the internal surface of the bore; e) a gasket for sealing the body to the end of the pipe section, such that fluids are prevented from flowing out the end of the pipe section via the bore in the body; f) a gasket retaining ring disposed within the gasket well, the gasket retaining ring comprising a shoulder and retaining the gasket within the gasket well; and g) a gripper washer disposed in the internal surface of the bore, the gripper washer comprising an outer periphery, the gripper washer being retained between the end connector and the gasket retaining ring, such that the outer periphery of the gripper washer is adjacent to the shoulder of the gasket retaining ring.

According to another embodiment of the present invention, there is provided a method of using a pipe cap, wherein the method comprises the steps of: a) providing the pipe cap according to the present invention; and b) inserting one end of a pipe section into the close-ended bore through the end connector.

DRAWINGS

Figure 2:
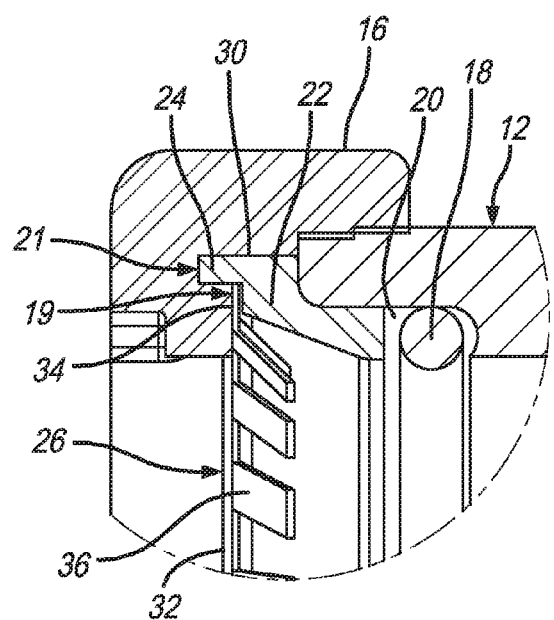

These and other features, aspects and advantages of the present invention will become better understood with reference to the following description, appended claims, and accompanying drawings where:

FIG. 1 is a cross-sectional side view of a pipe cap having features of the invention; and FIG. 2 is a magnified detail view of a portion of the pipe cap illustrated in FIG. 1.

DETAILED DESCRIPTION OF THE INVENTION

The following discussion describes in detail one embodiment of the present invention and several variations of that embodiment. This discussion should not be construed, however, as limiting the invention to those particular embodiments. Practitioners skilled in the art will recognize numerous other embodiments as well.

Definitions

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers, ingredients or steps.

The Invention

In a preferred embodiment of the present invention, as shown in FIGS. 1 and 2, there is provided a pipe cap 10 comprising a body 12, a close-ended bore 14 defined by the body 12, an end connector 16, a gasket 18, a gasket well 20, a gasket retaining ring 22 comprising a shoulder 24, and a gripper washer 26.

The body 12 can be any size and dimension, and made from any material, including but not limited to plastic, polyvinyl chloride, rubber or metal. The cross-section of the body 12 can be any shape, but preferably is circular.

The close-ended bore 14 is defined by the body 12 and comprises an internal surface 28. The bore 14 can be any size and dimension, but preferably is sized and dimensioned to accept and rigidly retain an end of a pipe section (not shown) for which the pipe cap 10 is to be used.

The end connector 16 can be any size and dimension, and made from any material, including but not limited to plastic, polyvinyl chloride, rubber or metal. The end connector 16 comprises a radially facing internal surface 30 and is attached to the body 12 by any means, including but not limited to friction welding, sonic welding or a suitable adhesive. In the embodiment illustrated in FIG. 1, the bore 14 extends out through the end connector 16. As shown in FIGS. 1 and 2, the end connector 16 also includes an axially facing interior surface 19 that includes a groove 21 disposed therein, and a radially facing interior surface 30.

The gasket well 20 is defined in the internal surface 28 of the bore 14. The gasket well 20 can be any size and dimension to accommodate the gasket 18.

The gasket 18 seals the body 12 to the end of the pipe section, such that fluids are prevented from flowing out of the end of the pipe section via the bore 14 in the pipe cap body 12. The gasket 18 is disposed within the gasket well 20, between the internal surface 28 of the bore 14 and the external surface of the end of the pipe section for which the pipe cap 10 is to be used. The gasket 18 can any size and dimension, and made from any material, including but not limited to plastic, rubber, metal, silicone or elastomeric material. Many known elastomeric materials can be used in the gasket 18 such as EPDM, neoprene, silicone, buna-N, Hypalon™ (Hypalon is a trademark for chlorosulfonated polyethylene (CSPE) synthetic rubber (CSM)) polyurethane, Santoprene™, (Santoprene is a trademark for Thermoplastic Elastomer (TPE) Thermoplastic Vulcanate (TPV) vinyl and Viton™ (Viton is a trademark for FKM). In the embodiment illustrated in FIGS. 1 and 2, the gasket 18 can be one or more O-rings.

The gasket retaining ring 22 comprises a continuous shoulder 24 and retains the gasket 18 within the gasket well 20. The gasket retaining ring 22 can be made from a variety of materials, including but not limited to plastic, polyvinyl chloride, rubber, metal, etc. The gasket retaining ring 22 can be made from the same material as the end connector 16 but does not have to be. The gasket retaining ring 22 can be made from a harder, less notch sensitive material. Alternatively, the gasket retaining ring 22 can be made from a softer more cushioning material. Having the same notch sensitivity as the end connector 16 is not a problem since the gasket retaining ring 22 has no tension axial stress. Thus, the notch sensitivity has less stress to magnify, and the radial stress applied to the gasket retaining ring 22 by the gripper washer 26 is reduced by any yielding or fracturing.

As can be seen in FIG. 2, the shoulder 24 of the gasket retaining ring 22 is adjacent to an outer periphery 32 of the gripper washer 26. By "adjacent," it is meant that the gripper washer 26 can be in contact with or in close proximity to the shoulder 24. As is shown in FIGS. 1 and 2, the shoulder 24 of the gasket retaining ring 22 prevents the gripper washer 26 from contacting the radially facing interior surface 30 of the end connector 16. The shoulder 24 of the gasket retaining ring 22 can be any size and any dimension, and made from any material including but not limited to plastic, polyvinyl chloride, or metal. The shoulder 24 of the gasket retaining ring 22 protects the end connector 16 from premature failure due to contact with the narrow outer periphery 32 of the gripper washer 26. Such protection is especially important where the materials used to construct the pipe cap 10 include CPVC or other materials which are notch sensitive. As shown in FIGS. 1 and 2, the shoulder 24 of the gasket retaining ring 22 is disposed within the groove 21 of the end connector 16.

The gasket retaining ring 22 is used to retain the radial stress of the gripper washer 26 as the gripper washer 26 digs into the end of the pipe section and tries to expand and invert. Since the end connector 16 has the full axial stress of the end of the pipe section, as well as the radial stresses applied by the gripper washer 26 and by the body 12 (as a result of hoop stress), if the gasket retaining ring 22 were to fracture, it would likely have little effect on the integrity of the pipe cap 10. Once a gripper washer 26 establishes a "grip" on the end of the pipe section, significantly less radial restraint is required. Also, any fracturing of the gasket retaining ring 22 will not cause a leak. Still further, any fracturing of the gasket retaining ring 22 does not reduce the resistance of the pipe cap 10 to axial loading unless the gripper washer 26 was to expand and loose "grip"—allowing the end of the pipe section to slip.

The gripper washer 26 is disposed in the internal surface 28 of the bore 14. The gripper washer 26 can be any size and dimension, and can be made from any material, including but not limited to plastic or metal. The gripper washer 26 is a washer-like structure, typically a metallic structure having an inner diameter, inner periphery and an outer periphery 32.

Preferably, as shown in the embodiment illustrated in the drawings, the gripper washer 26 is retained within a gripper washer well 34 defined in the internal surface 30 of the end connector 16. Typically, the gripper washer 26 is more proximate to an open end of the bore 14 than the gasket 18.

In the embodiment illustrated in FIGS. 1 and 2, the gripper washer 26 is retained between the end connector 16 and the gasket retaining ring 22, such that the outer periphery 32 of the gripper washer 26 is adjacent to the shoulder 24 of the gasket retaining ring 22. By "adjacent," it is meant that the gripper washer 26 can be in contact with or in close proximity to the shoulder 24.

Optionally, there can be more than one gripper washer 26 disposed in the pipe cap 10. The multiple gripper washers 26 can be disposed back to back of one another, or disposed in series, spaced apart from one another or within one another, such that the gripping fingers 36 of the multiple gripper washers 26 are oriented in the same direction. The multiple gripper washers 26 can be disposed within the same gripper washer well 34, or within different gripper washer wells 34.

The inner periphery of the gripper washer 26 comprises a large plurality of gripping fingers 36 which have been bent inwardly at an angle. The interior diameter of the gripper washer 26 is chosen be slightly smaller than the outside diameter of the end of the pipe section for which the pipe cap 10 is to be used. The gripper washer 26 is disposed at an open end of the bore 14 such that the gripping fingers 36 protrude toward the interior of the bore 14. Thus, when the end of a pipe section is thrust into the bore 14, the pipe section slips smoothly along the gripping fingers 36 of the gripper washer 26. Once fully disposed within the bore 14, however, the pipe section cannot be slid in a reverse direction relative to the gripping fingers 36. The gripping fingers 36 retain the pipe section firmly within the bore 14.

It can be appreciated, therefore, that the pipe cap 10 of the invention efficiently and effectively avoids the aforementioned problems inherent in prior art pipe caps. Using the pipe cap 10 of the invention, the capping of a pipe section is quickly and easily accomplished—by merely slipping the open end of the pipe cap bore 14 over the end of the pipe section. No time and effort need be expended in firmly attaching the pipe cap 10 to a pipe section end with adhesives or welding procedures.

A method of using the pipe cap 10 comprises the steps of a) providing the pipe cap 10 according to the present invention; and b) inserting one end of a pipe section into the close-ended bore 14 through the end connector 16.

Having thus described the invention, it should be apparent that numerous structural modifications and adaptations may be resorted to without departing from the scope and fair meaning of the instant invention as set forth herein above and described herein below by the claims.

What is claimed is:

1. A pipe cap comprising
a) a body;
b) a close-ended bore defined by the body, the close-ended bore comprising an internal surface and being sized and dimensioned to accept and rigidly retain an end of a pipe section for which the pipe cap is to be used;
c) an end connector comprising an axially facing interior surface and a radially facing interior surface, the axially facing interior surface having a groove formed therein, wherein the bore extends out through the end connector;
d) a gasket well defined in the internal surface of the bore;
e) a gasket disposed within the gasket well for sealing the body to the end of the pipe section, such that fluids are prevented from flowing out the end of the pipe section via the bore in the body;
f) a gasket retaining ring disposed between the end connector and the gasket for retaining the gasket within the gasket well, the gasket retaining ring having a shoulder disposed within the groove of the end connector; and g) a gripper washer disposed in the internal surface of the bore between the end connector and the gasket retaining ring;

wherein the shoulder of the gasket retaining ring prevents the gripper washer from contacting the radially facing interior surface of the end connector.

2. The pipe cap according to claim 1, wherein the gasket comprises one or more O-rings.

3. The pipe cap according to claim 1, further comprising a gripper washer well defined in the internal surface of the end connector.

4. The pipe cap according to claim 3, wherein the gripper washer is retained within the gripper washer well.

5. The pipe cap according to claim 1, wherein the gripper washer comprises a washer-like structure having an inner periphery and an outer periphery, the inner periphery comprising a plurality of gripping fingers which are bent inwardly.

6. A method of using a pipe cap, the method comprising the steps of:
   a) providing the pipe cap according to claim 1; and
   b) inserting one end of a pipe section into the close-ended bore through the end connector.

7. The method of claim 6, wherein the gasket comprises one or more O-rings.

8. The method of claim 7, further comprising a gripper washer well defined in the internal surface of the end connector, the gripper washer being retained within the gripper washer well.

9. The method of claim 6, wherein the gripper washer comprises a washer-like structure having an inner periphery and an outer periphery, the inner periphery comprising a plurality of gripping fingers which are bent inwardly.

10. The pipe cap of claim 1, wherein the gasket retaining ring is formed from polyvinyl chloride.

11. The pipe cap of claim 1, wherein the gasket retaining ring and the end connector are formed from a same material.

12. The pipe cap of claim 11, wherein the gasket retaining ring and the end connector are formed from polyvinyl chloride.

13. A pipe cap comprising
   a) a body;
   b) a close-ended bore defined by the body, the close-ended bore comprising an internal surface and being sized and dimensioned to accept and rigidly retain an end of a pipe section for which the pipe cap is to be used;
   c) an end connector comprising an axially facing interior surface and a radially facing interior surface, the axially facing interior surface having a groove formed therein, wherein the bore extends out through the end connector;
   d) a gasket well defined in the internal surface of the bore;
   e) a gasket disposed within the gasket well for sealing the body to the end of the pipe section, such that fluids are prevented from flowing out the end of the pipe section via the bore in the body;
   f) a gasket retaining ring disposed between the end connector and the gasket for retaining the gasket within the gasket well, the gasket retaining ring having a shoulder disposed within the groove of the end connector; and
   g) a gripper washer disposed in the internal surface of the bore, between the end connector and the gasket retaining ring;

wherein the shoulder of the gasket retaining ring prevents the gripper washer from contacting the radially facing interior surface of the end connector and the end connector and the gasket retaining ring are made from a same material.

14. A pipe cap comprising
   a) a body;
   b) a close-ended bore defined by the body, the close-ended bore comprising an internal surface and being sized and dimensioned to accept and rigidly retain an end of a pipe section for which the pipe cap is to be used;
   c) an end connector comprising an axially facing interior surface and a radially facing interior surface, the axially facing interior surface having a groove formed therein, wherein the bore extends out through the end connector;
   d) a gasket well defined in the internal surface of the bore;
   e) a gasket disposed within the gasket well for sealing the body to the end of the pipe section, such that fluids are prevented from flowing out the end of the pipe section via the bore in the body;
   f) a gasket retaining ring disposed between the end connector and the gasket for retaining the gasket within the gasket well, the gasket retaining ring having a shoulder disposed within the groove of the end connector; and
   g) a gripper washer disposed in the internal surface of the bore, between the end connector and the gasket retaining ring;

wherein the shoulder of the gasket retaining ring prevents the gripper washer from contacting the radially facing interior surface of the end connector and the end connector and the gasket retaining ring are made from polyvinyl chloride.

* * * * *